United States Patent Office
3,684,532
Patented Aug. 15, 1972

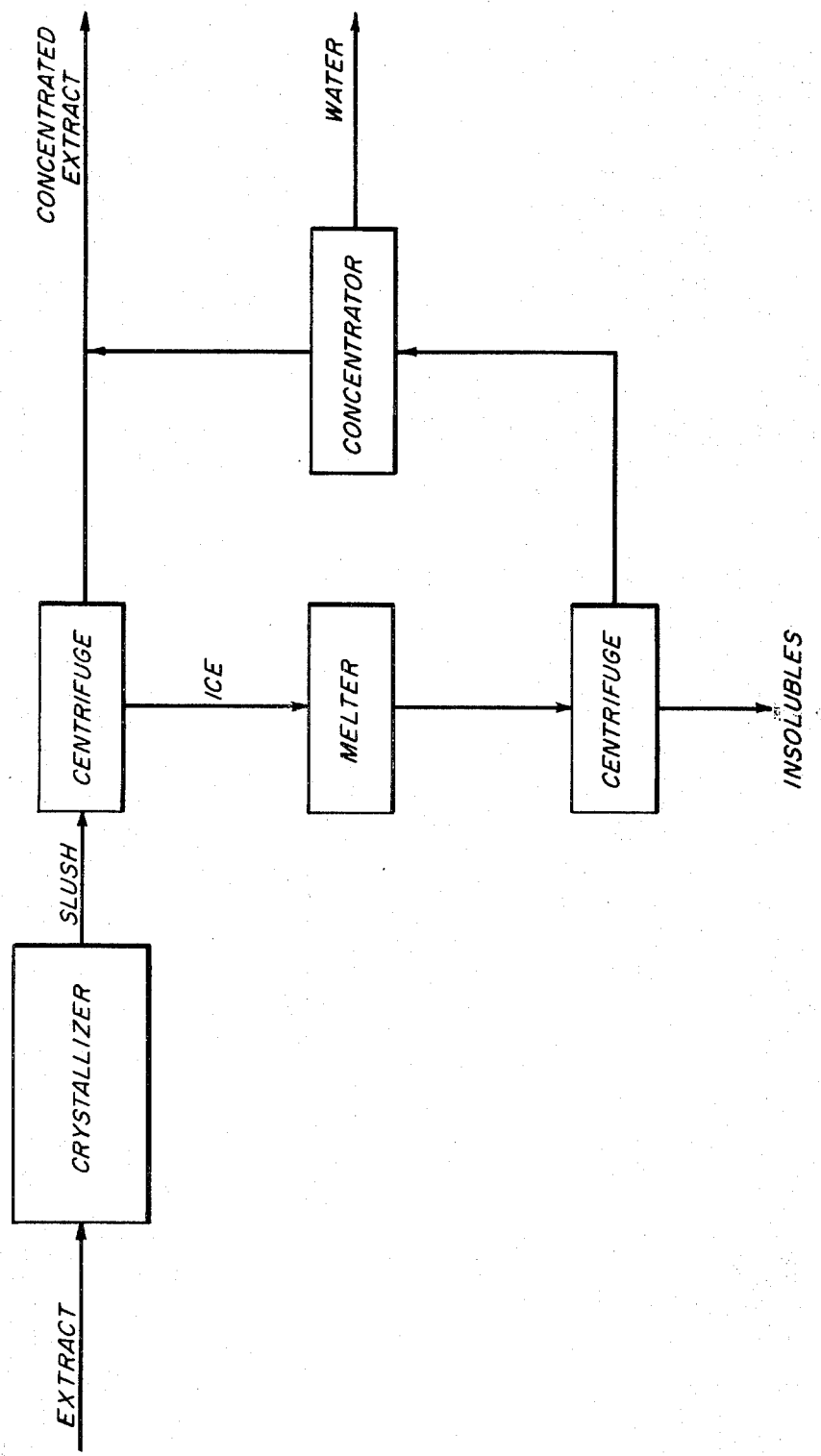

3,684,532
METHOD OF REDUCING SOLID LOSSES IN FREEZE-CONCENTRATION OF COFFEE EXTRACT
Martin Gottesman, 17 Heather Drive, Suffern, N.Y. 10901, and Fredric Davis Pascal, 131—11 Kew Gardens Road, Kew Gardens, N.Y. 11415
Filed Jan. 27, 1969, Ser. No. 794,380
Int. Cl. A23f 1/08
U.S. Cl. 99—199                      9 Claims

ABSTRACT OF THE DISCLOSURE

Coffee extract is freeze-concentrated by forming a mixture of ice crystals and concentrated extract in a crystallizer, and separating the concentrated extract from the ice by centrifugation. The separated ice crystals are melted, the melted ice stream is centrifuged to remove undesirable waxes and sediment, and the clarified and melted ice is concentrated and then added back to the concentrated extract stream.

BACKGROUND OF THE INVENTION

This invention pertains to a process for freeze-concentrating coffee extract. More particularly, it concerns an improved method of freeze-concentrating coffee extract whereby the solids loss is minimized and a high quality concentrated extract suitable for use in freeze-drying is obtained.

Freeze-drying of coffee extract is being utilized in industry today to produce a quality instant coffee which has been favorably received by the public. However, the cost of removing water via freeze-drying is very high as compared to other standard drying techniques such as spray-drying, and a considerable effort has been devoted to developing auxiliary processes for removing part of the water from coffee extract prior to the freeze-drying step. Methods such as vacuum evaporation, vacuum spray-drying and freeze-concentration have been investigated.

A primary requirement for any auxiliary process is preservation of quality, since the only justification of a commercial freeze-drying system is the production of a quality instant coffee. Freeze-concentration has proven to be a most desirable auxiliary process as product quality is least affected by this technique. Freeze-concentration involves chilling the coffee extract to below 32° F. and removal of heat from the chilled extract such that water will freeze out in the form of ice crystals. The ice crystals are separated out from the mixture of extract and ice (commonly referred to as slush), typically by centrifugation, and the remaining extract is a concentrated extract. For example, if coffee extract containing 20% solids by weight of the extract is allowed to equilibrate at a temperature of about 26° F., a slush containing about 43% ice crystals is formed, and this slush when centrifuged gives a concentrated extract of 35% solids with about 54% of the water originally present in the extract being removed as ice.

Coffee extract inherently contains some waxlike material which tends to precipitate out of solution if extract is allowed to cool. The rate of precipitation is a function of time and temperature and is much more rapid at low temperatures. As might be expected, it has been found that when extract is cooled to below 32° F. and held at such temperatures for a sufficient length of time (e.g. an hour) while ice crystals are allowed to form, the waxlike materials precipitate out. These waxes have been a major source of trouble in some freeze-concentration systems as they tend to blind some type of centrifuge screens and cause costly process shutdowns. One method of overcoming this problems is described in U.S. Pat. 1,507,410 to Zorn wherein the coffee extract is chilled and tempered to precipitate out the waxlike material and the precipitated waxes are removed prior to introducing the extract into the freeze-concentration equipment.

Techniques requiring precipitation and removal of waxes prior to freeze-concentration are undesirable for several reasons. First, it is an additional process step and thus adds to the cost of the operation. Second, it necessitates holding the extract in liquid form for an addtional period of time sufficient to allow precipitation. Extract quality is degraded when it is held up prior to drying for long periods of time. While such degradation is most noticeable at room temperatures, it is theorized that the effect of degradation due to holdup is cumulative and may occur to some degree even at low temperatures. Third, when the waxlike material is separated from the extract valuable soluble solids are inherently trapped in the removed waxes. These trapped solids represent process losses. Recovery of the trapped solids is difficult and even if recovered, their quality is suspect.

SUMMARY

It has been discovered that a freeze-concentration system can be sucessfully operated in such a manner that any waxlike material tending to precipitate out of a coffee extract can be removed with the ice stream and any soluble solids trapped by the waxlike precipitate can be recovered along with other soluble solids in the ice stream. The process comprises cooling coffee extract obtained via standard commercial percolation technique to below 32° F., further removing heat from the extract in order to cause part of the water to freeze out as ice crystals, thus forming a slush of concentrated coffee extract and ice crystals, separating the ice crystals from the concentrated extract and then further processing the ice stream to recover trapped soluble coffee solids. Crystallization should be performed in a continuous type crystallizer wherein the holdup time of extract is minimized. Coffee extract having an original concentration of 15% to 35% solids by weight of the extract is thus concentrated to a solids content of 30% to 65%.

The ice stream in addition to containing the ice crystals and soluble solids trapped by these crystals is also found to contain waxlike materials precipitated out of the extract during crystallization and additional soluble solids trapped by these waxlike materials. It is critical that centrifugation be performed in a manner which will cause the ice to bridge, thus trapping the waxes in the ice and preventing the screen from blinding. The ice stream after removal from the centrifuge is heated in order to melt all of the ice crystals and obtain a very dilute solution of coffee extract along with insoluble material. This solution is then subjected to centrifugation in a solid bowl centrifuge, such as a "Westphalia" or other similar types of desludging centrifuges, in order to remove the waxlike precipitates and any other insoluble material contained therein. The clarified dilute extract is then concentrated and blended back with the main stream of concenrtate obtained via freeze-concentration.

The process of this invention is advantageous in that processing of the extract to remove waxes prior to freeze-concentration is eliminated thus reducing processing costs and minimizing potential flavor degradation. It also has the decided advantage of allowing recovery of soluble solids which when trapped by the waxlike precipitates prior to freeze-concentration would represent product loss due to processing.

Referring now to the drawing, which the figure shows a schematic diagram of the freeze-concentration process of this invention.

DESCRIPTION OF THE PREFERRED EMBODIMENT

The process of this invention would normally encompass the following steps:

(1) Production of coffee extract via any commercial percolation process;

(2) Formation of a slush consisting of ice crystals and concentrated coffee extract by subjecting the extract obtained from percolation to a crystallization step;

(3) Separating the slush by centrifugation into two streams, a concentrated extract steam and an ice stream;

(4) Melting the ice in the ice stream and subjecting the melted ice stream to centrifugation in order to separate out undesirable insoluble materials; and (5) Concentrating the melted ice stream, preferably by low temperature evaporation, and blending this concentrate back into the main stream of concentrated extract.

By the foregoing process a concentrated coffee extract (about 30% to 65% solids) of high quality, suitable for use in a freeze-drying system, is obtained. The concentreated extract may then be frozen, ground into particulate pieces and freeze-dried in a conventional freeze-drying system. Alternatively, the concentrate may be subjected to other operations such as foaming and/or slushing prior to freezing in order to obtain a final freeze-dried coffee of lower density, darker color, etc.

The initial coffee extract obtained by percolation normally has a solids concentration of about 15% to 30%. The extract as it is drawn off from the percolation system is cooled to a temperature of less than 90° F. in order to protect the quality of the coffee solids prior to drying by such means as spray drying. When processing coffee extract in a freeze-drying system the temperature of the extract after percolation is often reduced to less than 50° F. in order to further protect the coffee solids from heat degradation since the primary purpose of a freeze-drying process is the production of a high quality extract.

In this stage of the process, an auxiliary step of concentration is frequently used in order to remove a substantial amount of the water by some means other than freeze-drying. This concentration prior to freeze-drying may be used as an economy step (freeze-drying being very costly) or to obtain a desired concentration as a means of controlling final product density. Typically, from 20% to 60% of the water may be removed in this concentration step. When utilizing freeze-concentration as the auxiliary process to freeze-drying the extract is often deliberately reduced in temperature to less than 50° F. to avoid quality degradation while the coffee extract is being held up for processing in the freeze-concentration equipment, since it is necessary during freeze-concentration to chill the extract below 32° F. anyway.

At these reduced temperatures, (e.g. below 55° F.) a waxlike material tends rapidly to precipitate out from the extract. Precipitation of waxes occurs prior to and during the crystallization step. When centrifuging the slush formed in the crystallizer, the precipitated waxes tend to blind the screens resulting in equipment shutdowns and product loss. One method of attempting to minimize processing difficulties is to deliberately temper the extract at below 55° F. in order to deliberately cause precipitation of the waxlike material. The precipitate is then separated out of the extract prior to crystallization. It has been found that up to 3% of the total soluble solids in the extract may be lost in this dewaxing operation.

In the process of this invention, the extract temperature is deliberately maintained at about 55° to 75° F. in order to avoid or minimize wax precipitation since even a minimum amount of precipitated waxes and tars adversely affect the appearance of the final dried coffee. Preferably, the temperature of the extract is kept at between 60 and 70° F. since at these temperatures both quality degradation and wax precipitation are advantageously balanced.

Wax precipitation also ocurs during the crystallization step. Since the ice crystals are formed at temperatures of less than 32° F. the conditions are ideal for accelerated precipitation of waxes. In some crystallizers, holdup of extract for from 2 to 4 hours is not unusual and these long holdup times are more than sufficient to cause most of the waxlike materials to precipitate. It has been found that when practicing the process of this invention the holdup time in the crystallizer should be less than 30 minutes and, preferably, less than 10 minutes. Minimum holdup in the crystallizer will minimize any wax precipitation. A preferred type of crystallizer for the process of this invention is a continuous, scraped-surface unit in which holdup time is a minimum. It has been found that a crystallizer such as that manufactured by the Votator Division of Chemtron Corp. is satisfactory for this purpose.

The slush produced under the preferred conditions of this process may be successfuly centrifuged without blinding of centrifuge screens. It has been found that a batch type centrifugate is preferred in this process as compared to a continuous type centrifuge. Apparently, when utilizing a continuous centrifugation small deposits of precipitated waxes tend to accumulate on the screen, eventually blinding the screen. However, when using a batch type centrifuge, wax is trapped in the ice layer and is plowed out of the basket.

The effective separation of insoluble materials in the batch centrifuge without blinding of the screens is probably due to a combination of factors. The batch centrifuge is operated at lower gravitational forces (G's) than a continuous centrifuge, especially while the ice layer is being built-up in the basket. Typically, G forces in a continuous centrifuge may be about 1200 to 1400 as compared to 300 to 400 in the batch unit. Also, the presence of small ice crystals produced in a "votator-type" unit is preferred. It is probably the combination of low G's and small ice crystals which result in building up of a layer of ice which effectively traps the wax-like material before it can reach the centrifuge screen and thus prevents the screen from blinding.

The ice stream obtained from the crystallization and centrifugation steps (freeze-concentration) is heated to melt the ice crystals. It is desirable at this point to avoid unnecessary heating in order to protect the quality of the soluble solids to be recovered from this stream. The solids concentration in the melted ice stream in the process of this invention is normally less than about 12% based on the weight of the melt ice stream. When this dilute solution is then subjected to clarification by filtration or centrifugation almost all of the soluble solids are recovered in the liquid stream. The reason that losses of soluble solids is very low in this operation is that any moisture trapped by the insoluble solids and waxlike materials being separated out contains a negligible quantity of soluble solids simply because the stream being treated is so dilute.

The clarified melt ice stream is concentrated in order to bring the concentration up to about the same level as the concentration in the main extract stream obtained after crystallization. It is necessary to protect the quality of these soluble solids in order to avoid downgrading the overall quality of the extract to be freeze-dried. However, since these solids represent a small fraction of the total solids originally obtained from the percolator a preferred method of concentration for the dilute extract stream is vacuum evaporation. The concentrated extract from this operation is added back to the main stream of concentrated extract for further processing. Alternatively, the melted ice stream when clarified could be concentrated by any standard high temperature evaporation technique, however, the quality of the recovered solids by such methods would not be as desirable.

The following example will further aid in understanding the process of this invention.

EXAMPLE

Coffee extract containing 25% soluble solids by weight of the extract was freeze-concentrated and freeze-dried in the following manner:

The coffee extract obtained from the percolators was maintained at a temperature of 55° to 65° F. and pumped directly from the percolators to a crystallizer feed tank. Holdup time of extract in the tank was 25 minutes. The tank was jacketed and the extract temperature in the tank was controlled by circulation of chilled water through the jacket.

Extract from hte feed tank was pumped through a crystallizer (a jacketed, scraped-surface heat-exchanger) wherein it was cooled by circulation of chilled brine through the jacket. In the crystallizer, water crystals were frozen out of the extract onto the refrigerated surface and these frozen crystals were scraped off the surface and mixed into the extract forming a slush. Holdup of extract from inlet to outlet of the crystallizer was about 5 minutes. Temperatures and flow rates were controlled such that the slush discharging from the crystallizer consisted of extract at a 35% concentration by weight of the unfrozen extract and the outlet temperature was about 26° F.

The slush from the crystallizer was fed into a centrifuge holdup tank and when a sufficient quantity of material for a centrifuge load was obtained the slush was centrifuged in a vertical batch centrifuge, the concentrated extract (35% solids by weight of extract) was sent to a tank for further processing in the freeze-drying system and the ice stream was treated separately.

The ice stream was heated in a jacketed tank in order to completely melt the ice crystals. The resultant melted ice stream contained about 11% solids. This melted ice stream was then subjected to centrifugation in a solid bowl "desludging" type centrifuge and all of the waxlike precipitate which was formed during crystallization, plus other sediment normally found in extract after percolation, were separated out from the melted ice stream.

The clarified melt was then concentrated in a vacuum evaporator to obtain a 35% concentration extract and the concentrated melt ice stream was added back to the main concentrated extract stream.

An average of 3600 lbs. of extract per hour (or 900 lbs. of soluble solids per hour) was processed in the foregoing manner for about 18 hours. Unrecovered soluble solids, the waxlike precipitate and other insoluble material separated out of the melted ice stream, averaged about 2.0% of the solids in the ice stream or 0.5% of the starting material (e.g. 4.5 lbs. of soluble solids per hour).

This represented a reduction in losses of about 1.5% when compared to a system wherein the percolator extract was first chilled and tempered and then centrifuged to remove waxes prior to crystallization, said system having losses of about 18 lbs. of soluble solids per hour.

The concentrated extract was frozen on a continuous belt freezer and the frozen sheets of extract were ground into particulate form and freeze-dried. The freeze-dried instant coffee was found to have a flavor closely resembling that of the original extract and was free of undesirable insoluble matter.

The foregoing example was intended for illustrative purposes and the scope of the invention is intended to be limited only by the appended claims.

What is claimed is:
1. A method of minimizing solids losses when freeze-concentrating coffee extract by removing any precipitated waxlike material with the ice stream and processing the ice stream to recover trapped soluble coffee solids comprising the steps of:
 (a) percolating roasted and ground coffee to obtain a coffee extract;
 (b) maintaining said extract at a temperature of about 55° F. to 75° F. prior to crystallization;
 (c) freezing ice crystals out of said extract to form a slush, said slush comprising a mixture of small ice crystals and concentrated extract and said freezing step taking place in less than 30 minutes;
 (d) batch centrifuging the slush to obtain a main stream of concentrated extract and an ice stream which contains from 20% to 60% of the water;
 (e) melting the ice crystals in said ice stream to obtain a melt;
 (f) centrifuging said melt to remove any insoluble waxlike material;
 (g) concentrating the centrifuged melt by evaporation of water to obtain a concentrated melt; and
 (h) adding the concentrated melt to the main stream of concentrated extract.

2. The method of claim 1 wherein the melt is concentrated by vacuum evaporation.

3. The method of claim 1 wherein the slush is formed in a continuous crystallizer, the holdup of extract in said crystallizer being less than 10 minutes.

4. The method of claim 3 wherein the holdup of the coffee extract obtained from the percolators prior to crystallization is less than about 30 minutes.

5. The method of claim 4 wherein the coffee extract obtained from the percolators has a soluble solids content of 15% to 35% by weight of the coffee extract and the main stream of concentrated extract has a solids content of 30% to 65% by weight of the concentrated extract.

6. The method of claim 5 wherein the concentrated melt has a solids content of 30% to 65% by weight of the concentrated melt.

7. The method of claim 5 wherein the concentrated extract and ice stream are separated in a batch centrifuge operation with a gravitational force of 300 to 400 G.

8. The method of claim 7 wherein the coffee extract obtained from the percolators is passed through a strainer as it is fed into the crystallizer to remove any coarse insoluble material.

9. The method of claim 8 wherein the melt ice stream is concentrated via vacuum evaporation.

References Cited

UNITED STATES PATENTS

| | | | |
|---|---|---|---|
| 2,886,587 | 5/1959 | Kolner | 99—199 |
| 3,050,952 | 8/1962 | Marwil | 62—58 |
| 3,205,078 | 9/1965 | Lund | 62—58 |
| 3,285,022 | 11/1966 | Pike | 62—58 |
| 3,362,178 | 1/1968 | Cottle et al. | 62—58 |
| 3,373,042 | 3/1968 | Elerath et al. | 99—71 |
| 3,381,302 | 4/1968 | Reimus et al. | 99—71 |
| 3,448,588 | 6/1969 | Scoggin | 62—58 |
| 3,449,129 | 6/1969 | Reimus et al. | 99—71 |
| 3,531,295 | 9/1970 | Ganiaris | 62—58 |

NORMAN YUDKOFF, Primary Examiner

R. T. FOSTER, Assistant Examiner

U.S. Cl. X.R.

62—58; 99—71